US011948146B2

(12) United States Patent
Prokop et al.

(10) Patent No.: US 11,948,146 B2
(45) Date of Patent: Apr. 2, 2024

(54) SYSTEM, METHOD, AND APPARATUS FOR SECURELY TRANSMITTING DATA VIA A THIRD-PARTY WEBPAGE

(71) Applicant: Visa International Service Association, San Francisco, CA (US)

(72) Inventors: Bartlomiej Piotr Prokop, Belfast (GB); James Donaldson, Moira (GB); Ryan Gillan, Belfast (GB); Matthew Neill, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 22 days.

(21) Appl. No.: 17/943,467

(22) Filed: Sep. 13, 2022

(65) Prior Publication Data

US 2023/0004962 A1 Jan. 5, 2023

Related U.S. Application Data

(63) Continuation of application No. 16/890,065, filed on Jun. 2, 2020, now Pat. No. 11,475,439.

(Continued)

(51) Int. Cl.
*G06Q 20/38* (2012.01)
*H04L 9/30* (2006.01)
(Continued)

(52) U.S. Cl.
CPC ..... *G06Q 20/3825* (2013.01); *G06Q 20/3829* (2013.01); *H04L 9/30* (2013.01);
(Continued)

(58) Field of Classification Search
CPC ........... G06Q 20/3825; G06Q 20/3829; G06Q 20/027; G06Q 20/12; G06Q 20/38215;
(Continued)

(56) References Cited

U.S. PATENT DOCUMENTS 8,347,083 B1 * 1/2013 Scudder .............. H04L 63/0435
713/159
9,154,470 B2 10/2015 Lebron et al.
(Continued)

FOREIGN PATENT DOCUMENTS

GB 2544998 A 6/2017

OTHER PUBLICATIONS

Bidgoli ("The Internet Encyclopedia", vol. 1, A-F, John Wiley & Sons, 2004) (Year: 2004).*

(Continued)

*Primary Examiner* — James D Nigh
(74) *Attorney, Agent, or Firm* — The Webb Law Firm

(57) ABSTRACT

Provided is a computer-implemented method for securely receiving data via a third-party webpage, including: generating configuration data in response to a request from a first system, the configuration data including a public key of a first key pair; digitally signing the configuration data based on a private key of a second key pair; transmitting the configuration data to the first system, the configuration data including code configured to facilitate the first system to embed a plurality of frames in a webpage, wherein the plurality of frames loads content from a domain that is independent from a domain that hosts the webpage; and verifying the configuration data based on a public key of the second key pair. The computer-implemented method may also include receiving, from a master frame of the plurality of frames, encrypted data. Systems and computer program products are also provided.

20 Claims, 9 Drawing Sheets

Related U.S. Application Data

(60) Provisional application No. 62/856,338, filed on Jun. 3, 2019.

(51) Int. Cl.
*H04L 9/32* (2006.01)
*G06Q 20/02* (2012.01)
*G06Q 20/12* (2012.01)
*G06Q 20/40* (2012.01)
*G06Q 30/0601* (2023.01)

(52) U.S. Cl.
CPC .......... *H04L 9/3213* (2013.01); *H04L 9/3247* (2013.01); *G06Q 2220/00* (2013.01)

(58) Field of Classification Search
CPC ............. G06Q 20/3823; G06Q 20/385; G06Q 20/4097; G06Q 2220/00; G06Q 30/0613; H04L 9/30; H04L 9/3213; H04L 9/3247
USPC .......................................................... 705/65
See application file for complete search history.

(56) References Cited

U.S. PATENT DOCUMENTS

| | | | | |
|---|---|---|---|---|
| 10,510,053 | B2* | 12/2019 | Armstrong | G06Q 20/3678 |
| 10,708,054 | B2* | 7/2020 | Donaldson | H04L 9/3247 |
| 11,334,892 | B2* | 5/2022 | Hamooni | G06Q 20/4016 |
| 2010/0094755 | A1 | 4/2010 | Kloster | |
| 2012/0016749 | A1* | 1/2012 | Lisbakken | G06Q 30/0277 |
| | | | | 705/14.71 |
| 2012/0089481 | A1 | 4/2012 | Iozzia et al. | |
| 2012/0143770 | A1* | 6/2012 | Pauker | G06Q 20/3829 |
| | | | | 705/77 |
| 2013/0318348 | A1* | 11/2013 | Lebron | H04L 63/0428 |
| | | | | 713/168 |
| 2014/0089201 | A1 | 3/2014 | Jakulin et al. | |
| 2016/0342997 | A1* | 11/2016 | De Tella | G06Q 20/382 |
| 2017/0193511 | A1 | 7/2017 | Dominguez et al. | |
| 2019/0116037 | A1* | 4/2019 | Donaldson | H04L 9/14 |

OTHER PUBLICATIONS

X-Cart:PayPal ("X-Cart:PayPal—X-Cart 4 Classic", retrieved from https://help.x-cart.com/X-Cart:PayPal, Jun. 9, 2016, 23 pages) (Year: 2016).*

PCI Data Security Standard (PCI DSS) (PCI Security Standards Council, Apr. 2017, 64 pages) (Year: 2017).*

Bidgoli, "The Internet Encyclopedia," vol. 1, A-F, John Wiley & Sons, 2004, all pages.

PCI Data Security Standard (PCI DSS), Information Supplement: Best Practices for Securing E-commerce, pci Security Standards Council, Apr. 2017, 64 pages.

X-Cart:PayPal, "X-Cart:PayPal-X-Cart4 Classic", retrieved from https://help.x-cart.com/X-Cart:PayPal, Jun. 9, 2016, 23 pages.

\* cited by examiner

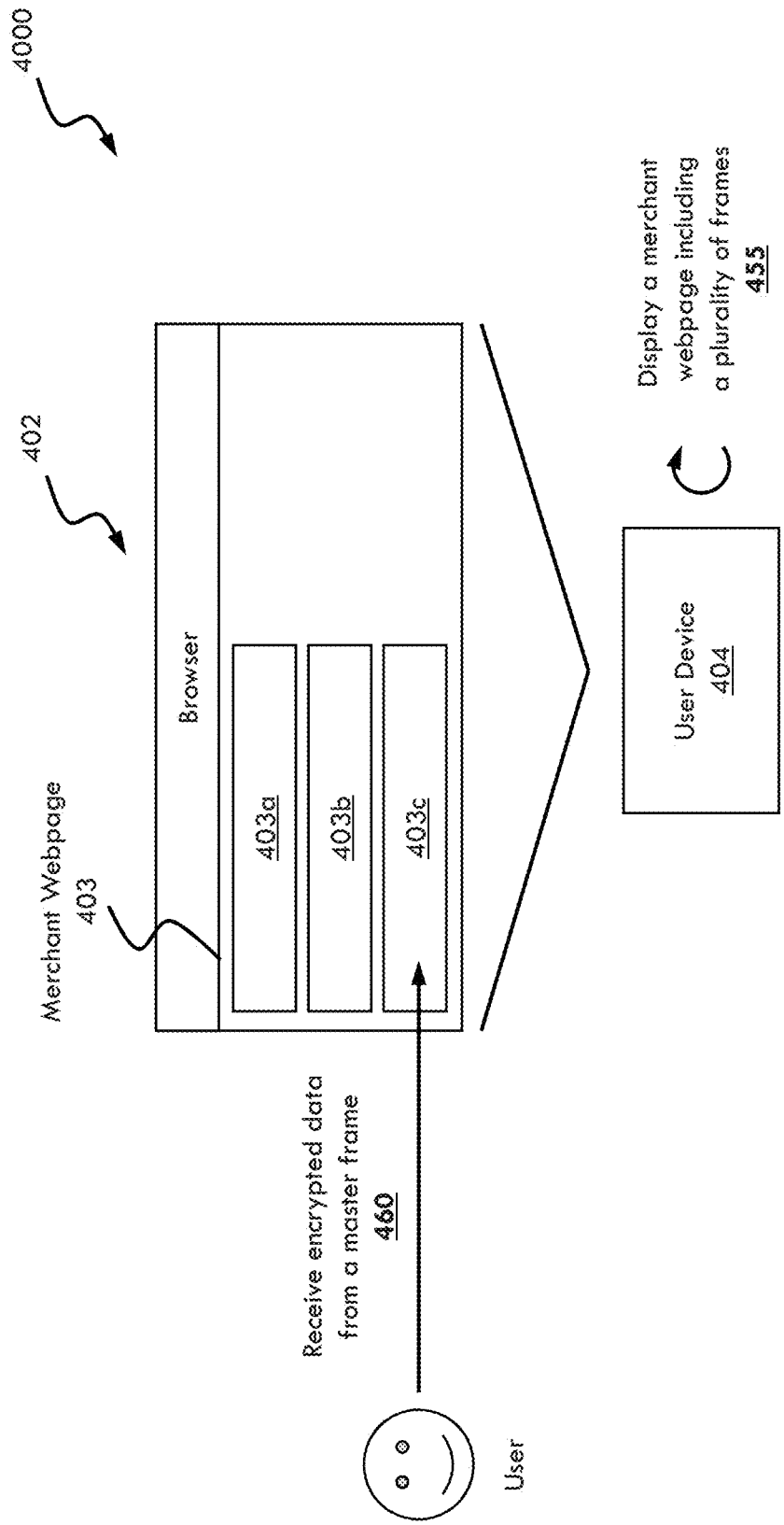

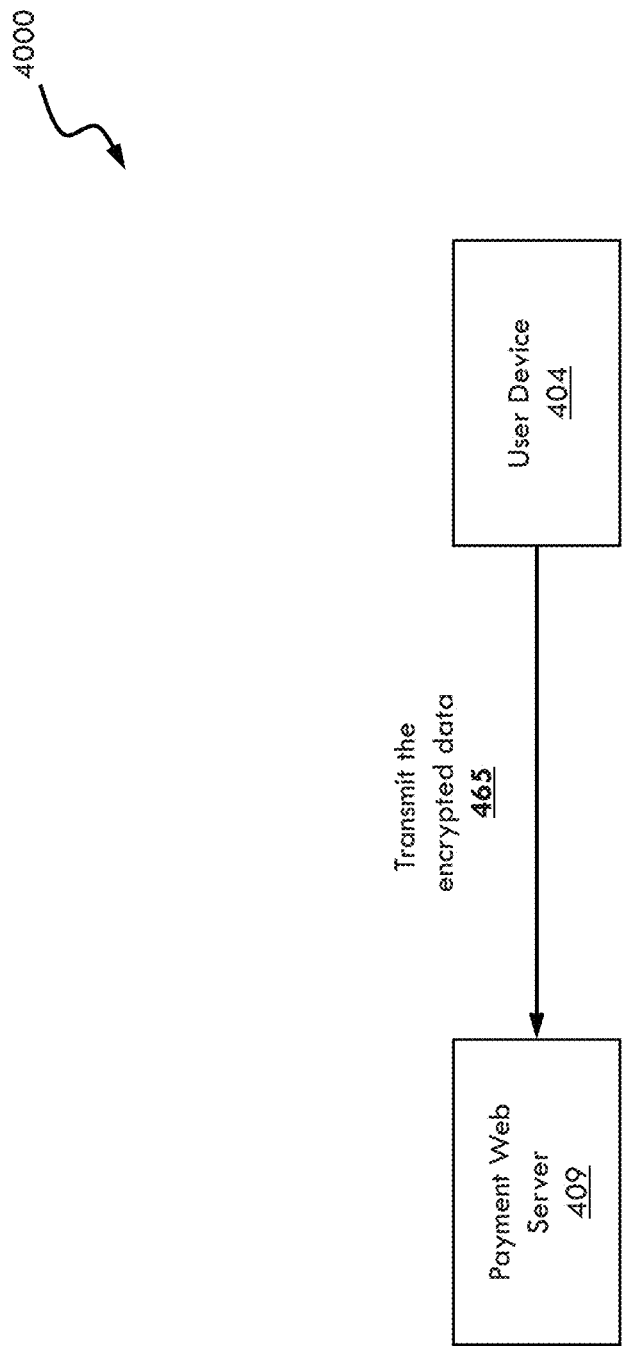

SYSTEM, METHOD, AND APPARATUS FOR SECURELY TRANSMITTING DATA VIA A THIRD-PARTY WEBPAGE

CROSS REFERENCE TO RELATED APPLICATIONS

This application is a continuation of U.S. patent application Ser. No. 16/890,065, filed on Jun. 2, 2020, which claims priority to U.S. Provisional Patent Application No. 62/856,338 filed on Jun. 3, 2019, the disclosures of which are incorporated by reference herein in their entirety.

BACKGROUND

1. Technical Field

This disclosure relates generally to web-based transactions and, in some non-limiting embodiments, to a system, method, and apparatus for securely transmitting data via a third-party webpage.

2. Technical Considerations

Websites, such as e-commerce websites hosted by merchants, may not be trusted by a user and/or financial institution. Even where a third-party website integrates elements from a trusted service, sensitive account information may be compromised by an insecure connection, a spoofed or faked trusted service, a man-in-the-middle (MitM) attack, and/or the like. In the MitM attack, for example, payment information may be viewed and/or updated by another entity not intended to be involved in a payment transaction. As a result, it may be difficult for entities involved in the payment transaction (e.g., the user, the financial institution, the merchant, and/or the like) to determine whether the data received was viewed or updated by the entity not intended to be involved in the payment transaction.

SUMMARY

According to non-limiting embodiments or aspects, provided is a computer-implemented method for securely collecting data via a third-party webpage, comprising: generating, with at least one processor, configuration data in response to a request from a first system; transmitting, with at least one processor, the configuration data to the webpage, the configuration data comprising code configured to facilitate the first system to embed a plurality of in-line frames in the webpage; verifying, with at least one processor, the configuration data; and in response to verifying the configuration data, rendering, with at least one processor, content in the plurality of in-line frames from a domain independent of a domain hosting the webpage; and receiving, from at least one frame of the plurality of in-line frames, user data.

In some non-limiting embodiments or aspects, the configuration data comprises a public key of a first key pair. In some non-limiting embodiments or aspects, the user data comprises encrypted user data encrypted with the public key of the first key pair. In some non-limiting embodiments or aspects, the method further comprises digitally signing, with at least one processor, the configuration data based on a private key of a second key pair. In some non-limiting embodiments or aspects, the configuration data is verified based on a public key of the second key pair. In some non-limiting embodiments or aspects, the method further comprises: decrypting, with at least one processor, the encrypted data based on a private key of the first key pair, resulting in the user data; transmitting, with at least one processor, the user data to a token management system; receiving, from the token management system, a transient token generated based on the user data; and transmitting, with at least one processor, the transient token to at least one frame of the plurality of in-line frames. In some non-limiting embodiments or aspects, the method further comprises: transmitting the transient token from the at least one in-line frame to the first system; receiving, from the first system, a transaction request comprising the transient token; obtaining, from the token management system, the user data; and generating an authorization request based on the user data. In some non-limiting embodiments or aspects, the user data is temporarily stored in memory by the token management system, the method further comprises: deleting the user data after authorization based on the authorization request. In some non-limiting embodiments or aspects, the domain hosting the content loaded into the plurality of in-line frames is hosted by a payment gateway system.

According to non-limiting embodiments or aspects, provided is a computer-implemented method for securely collecting data via a third-party webpage, comprising: generating, with at least one processor, configuration data in response to a request from a first system, the configuration data comprising a public key of a first key pair; digitally signing, with at least one processor, the configuration data based on a private key of a second key pair; transmitting, with at least one processor, the configuration data to the webpage, the configuration data comprising code configured to facilitate the first system to embed a plurality of in-line frames in the webpage, the plurality of in-line frames loads content from a domain that is independent from a domain that hosts the webpage; verifying, with at least one processor, the configuration data based on a public key of the second key pair; and receiving, from a master frame of the plurality of in-line frames, encrypted data, the encrypted data comprising user data encrypted with the public key of the first key pair.

In some non-limiting embodiments or aspects, the method further comprises: decrypting, with at least one processor, the encrypted data based on a private key of the first key pair, resulting in the user data; transmitting, with at least one processor, the user data to a token management system; receiving, from the token management system, a transient token generated based on the user data; and transmitting, with at least one processor, the transient token to at least one frame of the plurality of in-line frames. In some non-limiting embodiments or aspects, the method further comprises: passing the transient token from the at least one in-line frame to the first system; receiving, from the first system, a transaction request comprising the transient token; obtaining, from the token management system, the user data; and generating an authorization request based on the user data. In some non-limiting embodiments or aspects, the user data is temporarily stored in memory by the token management system, the method further comprises: deleting the user data after authorization based on the authorization request. In some non-limiting embodiments or aspects, the public key of the second key pair is embedded in a library file for a client-side script. In some non-limiting embodiments or aspects, the domain hosting the content loaded into the plurality of in-line frames is hosted by a payment gateway system. In some non-limiting embodiments, the method further comprises digitally signing, with at least one processor, the transient token based on the private key of the first key pair.

According to non-limiting embodiments or aspects, provided is a system for securely collecting data via a third-party webpage, comprising at least one processor programmed or configured to: generate configuration data in response to a request from a first system; transmit the configuration data to the webpage, the configuration data comprising code configured to facilitate the first system to embed a plurality of in-line frames in the webpage; verify the configuration data; and in response to verifying the configuration data, render content in the plurality of in-line frames from a domain independent of a domain hosting the webpage; and receive, from at least one frame of the plurality of in-line frames, user data. In some non-limiting embodiments or aspects, the configuration data comprises a public key of a first key pair. In some non-limiting embodiments or aspects, the user data comprises encrypted user data encrypted with the public key of the first key pair.

In some non-limiting embodiments or aspects, the at least one processor is further programmed or configured to digitally sign the configuration data based on a private key of a second key pair. In some non-limiting embodiments or aspects, the configuration data is verified based on a public key of the second key pair. In some non-limiting embodiments or aspects, the at least one processor is further programmed or configured to: decrypt the encrypted data based on a private key of the first key pair, resulting in the user data; transmit the user data to a token management system; receive a transient token generated based on the user data; and transmit the transient token to at least one frame of the plurality of in-line frames. In some non-limiting embodiments or aspects, the at least one processor is further programmed or configured to: transmit the transient token from the at least one in-line frame to the first system; receive, from the first system, a transaction request comprising the transient token; obtain, from the token management system, the user data; and generate an authorization request based on the user data. In some non-limiting embodiments or aspects, the user data is temporarily stored in memory by the token management system, the method further comprising: deleting the user data after authorization based on the authorization request. In some non-limiting embodiments or aspects, the domain hosting the content loaded into the plurality of in-line frames is hosted by a payment gateway system. In some non-limiting embodiments, the at least one processor is further programmed or configured to digitally sign the transient token based on the private key of the first key pair.

According to non-limiting embodiments or aspects, provided is a computer program product for securely collecting data via a third-party webpage, comprising at least one non-transitory computer-readable medium including program instructions that, when executed by at least one processor, cause the at least one processor to: generate configuration data in response to a request from a first system; transmit the configuration data to the merchant webpage, the configuration data comprising code configured to facilitate the first system to embed a plurality of in-line frames in the webpage; verify the configuration data; in response to verifying the configuration data, render content in the plurality of in-line frames from a domain independent of a domain hosting the webpage; and receive, from at least one frame of the plurality of in-line frames, user data.

According to non-limiting embodiments or aspects, provided is a computer-implemented method for securely collecting data via a third-party webpage, comprising: generating, with at least one processor, configuration data in response to a request from a third-party system associated with the third-party webpage; transmitting, with at least one processor, the configuration data to the third-party system and/or third-party webpage, the configuration data comprising code configured to facilitate the third-party webpage to embed a plurality of in-line frames in the webpage; verifying, with at least one processor, the configuration data; in response to verifying the configuration data, rendering, with at least one processor, content in the plurality of in-line frames from a domain independent of a domain hosting the third-party webpage; and receiving, from at least one frame of the plurality of in-line frames, user data. In some non-limiting embodiments or aspects, the configuration data comprises a public key of a first key pair. In some non-limiting embodiments or aspects, the user data comprises encrypted user data encrypted with the public key of the first key pair.

In some non-limiting embodiments or aspects, the method further comprises digitally signing, with at least one processor, the configuration data based on a private key of a second key pair. In some non-limiting embodiments or aspects, the configuration data is verified based on a public key of the second key pair. In some non-limiting embodiments or aspects, the method further comprises: decrypting, with at least one processor, the encrypted data based on a private key of the first key pair, resulting in the user data; transmitting, with at least one processor, the user data to a token management system; receiving, from the token management system, a transient token generated based on the user data; and transmitting, with at least one processor, the transient token to at least one frame of the plurality of in-line frames. In some non-limiting embodiments or aspects, the method further comprises: transmitting the transient token from the at least one in-line frame to the third-party system; receiving, from the third-party system, a transaction request comprising the transient token; obtaining, from the token management system, the user data; and generating an authorization request based on the user data. In some non-limiting embodiments or aspects, the user data is temporarily stored in memory by the token management system. The method further comprises: deleting the user data after authorization based on the authorization request. In some non-limiting embodiments or aspects, the domain hosting the content loaded into the plurality of in-line frames is hosted by a payment gateway system. In some non-limiting embodiments, the method further comprises digitally signing, with at least one processor, the transient token based on the private key of the first key pair.

In some non-limiting embodiments or aspects, provided is a computer-implemented method for securely collecting data via a third-party webpage, comprising: generating, with at least one processor, configuration data in response to a request from a first system, the configuration data comprising a public key of a first key pair; digitally signing, with at least one processor, the configuration data based on a private key of a second key pair; transmitting, with at least one processor, the configuration data to the first system, the configuration data comprising code configured to facilitate the first system to embed a plurality of frames in a webpage, wherein the plurality of frames loads content from a domain that is independent from a domain that hosts the webpage; verifying, with at least one processor, the configuration data based on a public key of the second key pair; and receiving, from a master frame of the plurality of frames, encrypted data, the encrypted data comprising user data encrypted with the public key of the first key pair.

In some non-limiting embodiments or aspects, the computer-implemented method further comprises: decrypting, with at least one processor, the encrypted data based on a private key of the first key pair, resulting in the user data; transmitting, with at least one processor, the user data to a token management system; receiving, from the token management system, a transient token generated based on the user data; and transmitting, with at least one processor, the transient token to at least one frame of the plurality of frames.

In some non-limiting embodiments or aspects, the first system is a merchant system. In some non-limiting embodiments or aspects, the computer-implemented method further comprises: passing the transient token from the at least one frame to the first system; receiving, from the first system, a transaction request comprising the transient token; obtaining, from the token management system, the user data; and generating an authorization request based on the user data.

In some non-limiting embodiments or aspects, the user data is temporarily stored in memory by the token management system. In some non-limiting embodiments or aspects, the method further comprises: deleting the user data after authorization based on the authorization request.

In some non-limiting embodiments or aspects, the public key of the second key pair is embedded in a library file for a client-side script.

In some non-limiting embodiments or aspects, the domain hosting the content loaded into the plurality of frames is hosted by a payment gateway system.

In some non-limiting embodiments or aspects, the computer-implemented method further comprises: digitally signing, with at least one processor, the transient token based on the private key of the first key pair.

In some non-limiting embodiments or aspects, a system for securely collecting data via a third-party webpage, comprises: at least one processor programmed or configured to: generate configuration data in response to a request from a first system, the configuration data comprising a public key of a first key pair; digitally sign the configuration data based on a private key of a second key pair; transmit the configuration data to the first system, the configuration data comprising code configured to facilitate the first system to embed a plurality of frames in a webpage, wherein the plurality of frames loads content from a domain that is independent from a domain that hosts the webpage; and verify the configuration data based on a public key of the second key pair.

In some non-limiting embodiments or aspects, the at least one processor is further programmed or configured to: receive, from a master frame of the plurality of frames, encrypted data, the encrypted data comprising user data encrypted with the public key of the first key pair.

In some non-limiting embodiments or aspects, the at least one processor is further programmed or configured to: decrypt the encrypted data based on a private key of the first key pair, resulting in the user data; transmit the user data to a token management system; receive, from the token management system, a transient token generated based on the user data; and transmit the transient token to at least one frame of the plurality of frames.

In some non-limiting embodiments or aspects, the at least one processor is further programmed or configured to: pass the transient token from the at least one frame to the first system; receive, from the first system, a transaction request comprising the transient token; obtain, from the token management system, the user data; and generate an authorization request based on the user data.

In some non-limiting embodiments or aspects, the user data is temporarily stored in memory by the token management system, wherein the at least one processor is further programmed or configured to: delete the user data after authorization based on the authorization request.

In some non-limiting embodiments or aspects, the public key of the second key pair is embedded in a library file for a client-side script.

In some non-limiting embodiments or aspects, the domain hosting the content loaded into the plurality of frames is hosted by a payment gateway system.

In some non-limiting embodiments or aspects, the at least one processor is further programmed or configured to: digitally sign the transient token based on the private key of the first key pair.

In some non-limiting embodiments or aspects, a computer program product for securely collecting data via a third-party webpage, comprising at least one non-transitory computer-readable medium comprising one or more instructions that, when executed by at least one processor, cause the at least one processor to: generate configuration data in response to a request from a first system, the configuration data comprising a public key of a first key pair; digitally sign the configuration data based on a private key of a second key pair; transmit the configuration data to the first system, the configuration data comprising code configured to facilitate the first system to embed a plurality of frames in a webpage, wherein the plurality of frames loads content from a domain that is independent from a domain that hosts the webpage; verify the configuration data based on a public key of the second key pair; receive, from a master frame of the plurality of frames, encrypted data, the encrypted data comprising user data encrypted with the public key of the first key pair; decrypt the encrypted data based on a private key of the first key pair, resulting in the user data; transmit the user data to a token management system; receive, from the token management system, a transient token generated based on the user data; and transmit the transient token to at least one frame of the plurality of frames.

In some non-limiting embodiments or aspects, the one or more instructions further cause the at least one processor to: pass the transient token from the at least one frame to the first system; receive, from the first system, a transaction request comprising the transient token; obtain, from the token management system, the user data; and generate an authorization request based on the user data.

In some non-limiting embodiments or aspects, the user data is temporarily stored in memory by the token management system, wherein the one or more instructions further cause the at least one processor to: delete the user data after authorization based on the authorization request.

In some non-limiting embodiments or aspects, the public key of the second key pair is embedded in a library file for a client-side script.

In some non-limiting embodiments or aspects, the one or more instructions further cause the at least one processor to: digitally sign the transient token based on the private key of the first key pair.

Further non-limiting aspects or embodiments are set forth in the following numbered clauses:

Clause 1: A computer-implemented method for securely collecting data through a third-party webpage, comprising: generating, with at least one processor, configuration data in response to a request from a first system; transmitting, with at least one processor, the configuration data to the first system, the configuration data comprising code configured to facilitate the first system to embed a plurality of frames in a merchant webpage; verifying, with at least one processor, the configuration data; in response to verifying the configuration data, rendering, with at least one processor, content in the plurality of frames from a domain independent of a domain hosting the merchant webpage; and receiving, from at least one frame of the plurality of frames, user data.

Clause 2: The computer-implemented method of clause 1, wherein the configuration data comprises a public key of a first key pair.

Clause 3: The computer-implemented method of clauses 1 or 2, wherein the user data comprises encrypted user data encrypted with the public key of the first key pair.

Clause 4: The computer-implemented of any of clauses 1-3, further comprising digitally signing, with at least one processor, the configuration data based on a private key of a second key pair.

Clause 5: The computer-implemented method of any of clauses 1-4, wherein the configuration data is verified based on a public key of the second key pair.

Clause 6: The computer-implemented method of any of clauses 1-5, further comprising: decrypting, with at least one processor, the encrypted data based on a private key of the first key pair, resulting in the user data; transmitting, with at least one processor, the user data to a token management system; receiving, from the token management system, a transient token generated based on the user data; and transmitting, with at least one processor, the transient token to at least one frame of the plurality of frames.

Clause 7: The computer-implemented method of any of clauses 1-6, further comprising: transmitting the transient token from the at least one frame to the first system; receiving, from the first system, a transaction request comprising the transient token; obtaining, from the token management system, the user data; and generating an authorization request based on the user data.

Clause 8: The computer-implemented method of any of clauses 1-7, wherein the user data is temporarily stored in memory by the token management system, the method further comprising: deleting the user data after authorization based on the authorization request.

Clause 9: The computer-implemented method of any of clauses 1-8, wherein the domain hosting the content loaded into the plurality of frames is hosted by a payment gateway system.

Clause 10: The computer-implemented method of any of clauses 1-9, further comprising: digitally signing, with at least one processor, the transient token based on the private key of the first key pair.

Clause 11: A computer-implemented method for securely collecting data through a third-party webpage, comprising: generating, with at least one processor, configuration data in response to a request from a first system, the configuration data comprising a public key of a first key pair; digitally signing, with at least one processor, the configuration data based on a private key of a second key pair; transmitting, with at least one processor, the configuration data to the first system, the configuration data comprising code configured to facilitate the first system to embed a plurality of frames in a merchant webpage, wherein the plurality of frames load content from a domain that is independent from a domain that hosts the merchant webpage; verifying, with at least one processor, the configuration data based on a public key of the second key pair; and receiving, from a master frame of the plurality of frames, encrypted data, the encrypted data comprising user data encrypted with the public key of the first key pair.

Clause 12: The computer-implemented method of clause 11, further comprising: decrypting, with at least one processor, the encrypted data based on a private key of the first key pair, resulting in the user data; transmitting, with at least one processor, the user data to a token management system; receiving, from the token management system, a transient token generated based on the user data; and transmitting, with at least one processor, the transient token to at least one frame of the plurality of frames.

Clause 13: The computer-implemented method of clauses 11 or 12, further comprising: passing the transient token from the at least one frame to the first system; receiving, from the first system, a transaction request comprising the transient token; obtaining, from the token management system, the user data; and generating an authorization request based on the user data.

Clause 14: The computer-implemented method of any of clauses 11-13, wherein the user data is temporarily stored in memory by the token management system, the method further comprising: deleting the user data after authorization based on the authorization request.

Clause 15: The computer-implemented method of any of clauses 11-14, wherein the public key of the second key pair is embedded in a library file for a client-side script.

Clause 16: The computer-implemented method of any of clauses 11-15, wherein the domain hosting the content loaded into the plurality of frames is hosted by a payment gateway system.

Clause 17: The computer-implemented method of any of clauses 11-16, further comprising: digitally signing, with at least one processor, the transient token based on the private key of the first key pair.

Clause 18: A system for securely collecting data through a third-party webpage, comprising at least one processor programmed or configured to: generate configuration data in response to a request from a first system; transmit the configuration data to the first system, the configuration data comprising code configured to facilitate the first system to embed a plurality of frames in a merchant webpage; verify the configuration data; and in response to verifying the configuration data, render content in the plurality of frames from a domain independent of a domain hosting the merchant webpage; and receive, from at least one frame of the plurality of frames, user data.

Clause 19: The system of clause 18, wherein the configuration data comprises a public key of a first key pair.

Clause 20: The system of clauses 18 or 19, wherein the user data comprises encrypted user data encrypted with the public key of the first key pair.

Clause 21: The system of any of clauses 18-20, wherein the at least one processor is further programmed or configured to digitally sign the configuration data based on a private key of a second key pair.

Clause 22: The system of any of clauses 18-21, wherein the configuration data is verified based on a public key of the second key pair.

Clause 23: The system of any of clauses 18-22, wherein the at least one processor is further programmed or configured to: decrypt the encrypted data based on a private key of the first key pair, resulting in the user data; transmit the user data to a token management system; receive a transient token generated based on the user data; and transmit the transient token to at least one frame of the plurality of frames.

Clause 24: The system of any of clauses 18-23, wherein the at least one processor is further programmed or configured to: transmit the transient token from the at least one frame to the first system; receive, from the first system, a transaction request comprising the transient token; obtain, from the token management system, the user data; and generate an authorization request based on the user data.

Clause 25: The system of any of clauses 18-24, wherein the user data is temporarily stored in memory by the token management system, the method further comprising: deleting the user data after authorization based on the authorization request.

Clause 26: The system of any of clauses 18-25, wherein the domain hosting the content loaded into the plurality of frames is hosted by a payment gateway system.

Clause 27: The system of any of clauses 18-26, wherein the at least one processor is further programmed or configured to digitally sign the transient token based on the private key of the first key pair.

Clause 28: A computer program product for securely collecting data through a third-party webpage, comprising at least one non-transitory computer-readable medium including program instructions that, when executed by at least one processor, cause the at least one processor to: generate configuration data in response to a request from a first system; transmit the configuration data to the first system, the configuration data comprising code configured to facilitate the first system to embed a plurality of frames in a merchant webpage; verify the configuration data; and in response to verifying the configuration data, render content in the plurality of frames from a domain independent of a domain hosting the merchant webpage; and receive, from at least one frame of the plurality of frames, user data.

Clause 29: A computer-implemented method for securely collecting data through a third-party webpage, comprising: generating, with at least one processor, configuration data in response to a request from a third-party system associated with the third-party webpage; transmitting, with at least one processor, the configuration data to the third-party system and/or third-party webpage, the configuration data comprising code configured to facilitate the third-party webpage to embed a plurality of frames in the third-party webpage; verifying, with at least one processor, the configuration data; and in response to verifying the configuration data, rendering, with at least one processor, content in the plurality of frames from a domain independent of a domain hosting the third-party webpage; and receiving, from at least one frame of the plurality of frames, user data.

Clause 30: The computer-implemented method of clause 29, wherein the configuration data comprises a public key of a first key pair.

Clause 31: The computer-implemented method of clauses 29 or 30, wherein the user data comprises encrypted user data encrypted with the public key of the first key pair.

Clause 32: The computer-implemented method of any of clauses 29-31, further comprising digitally signing, with at least one processor, the configuration data based on a private key of a second key pair.

Clause 33: The computer-implemented method of any of clauses 29-32, wherein the configuration data is verified based on a public key of the second key pair.

Clause 34: The computer-implemented method of any of clauses 29-33, further comprising: decrypting, with at least one processor, the encrypted data based on a private key of the first key pair, resulting in the user data; transmitting, with at least one processor, the user data to a token management system; receiving, from the token management system, a transient token generated based on the user data; and transmitting, with at least one processor, the transient token to at least one frame of the plurality of frames.

Clause 35: The computer-implemented method of any of clauses 29-34, further comprising: transmitting the transient token from the at least one frame to the third-party system; receiving, from the third-party system, a transaction request comprising the transient token; obtaining, from the token management system, the user data; and generating an authorization request based on the user data.

Clause 36: The computer-implemented method of any of clauses 29-35, wherein the user data is temporarily stored in memory by the token management system, the method further comprising: deleting the user data after authorization based on the authorization request.

Clause 37: The computer-implemented method of any of clauses 29-36, wherein the domain hosting the content loaded into the plurality of frames is hosted by a payment gateway system.

Clause 38: The computer-implemented method of any of clauses 29-37, further comprising digitally signing, with at least one processor, the transient token based on the private key of the first key pair Clause 39: A system for securely collecting data via a third-party webpage, comprising: at least one processor programmed or configured to: generate configuration data in response to a request from a first system, the configuration data comprising a public key of a first key pair; digitally sign the configuration data based on a private key of a second key pair; transmit the configuration data to the first system, the configuration data comprising code configured to facilitate the first system to embed a plurality of frames in a webpage, wherein the plurality of frames loads content from a domain that is independent from a domain that hosts the webpage; and verify the configuration data based on a public key of the second key pair.

Clause 40: The system of clause 39, wherein the at least one processor is further programmed or configured to: receive, from a master frame of the plurality of frames, encrypted data, the encrypted data comprising user data encrypted with the public key of the first key pair.

Clause 41: The system of clauses 39 or 40, wherein the at least one processor is further programmed or configured to: decrypt the encrypted data based on a private key of the first key pair, resulting in the user data; transmit the user data to a token management system; receive, from the token management system, a transient token generated based on the user data; and transmit the transient token to at least one frame of the plurality of frames.

Clause 42: The system of any of clauses 39-41, wherein the at least one processor is further programmed or configured to: pass the transient token from the at least one frame to the first system; receive, from the first system, a transaction request comprising the transient token; obtain, from the token management system, the user data; and generate an authorization request based on the user data.

Clause 43: The system of any of clauses 39-42, wherein the user data is temporarily stored in memory by the token management system, and wherein the at least one processor is further programmed or configured to: delete the user data after authorization based on the authorization request.

Clause 44: The system of any of clauses 39-43, wherein the public key of the second key pair is embedded in a library file for a client-side script.

Clause 45: The system of any of clauses 39-44, wherein the domain hosting the content loaded into the plurality of frames is hosted by a payment gateway system.

Clause 46: The system of any of clauses 39-45, wherein the at least one processor is further programmed or configured to: digitally sign the transient token based on the private key of the first key pair.

Clause 47: A computer program product for securely collecting data via a third-party webpage, comprising at least one non-transitory computer-readable medium comprising one or more instructions that, when executed by at least one processor, cause the at least one processor to: generate configuration data in response to a request from a first system, the configuration data comprising a public key of a first key pair; digitally sign the configuration data based on a private key of a second key pair; transmit the configuration data to the first system, the configuration data comprising code configured to facilitate the first system to embed a plurality of frames in a webpage, wherein the plurality of frames loads content from a domain that is independent from a domain that hosts the webpage; verify the configuration data based on a public key of the second key pair; receive, from a master frame of the plurality of frames, encrypted data, the encrypted data comprising user data encrypted with the public key of the first key pair; decrypt the encrypted data based on a private key of the first key pair, resulting in the user data; transmit the user data to a token management system; receive, from the token management system, a transient token generated based on the user data; and transmit the transient token to at least one frame of the plurality of frames.

Clause 48: The computer program product of clause 47, wherein the one or more instructions further cause the at least one processor to: pass the transient token from the at least one frame to a first system; receive, from the first system, a transaction request comprising the transient token; obtain, from the token management system, the user data; and generate an authorization request based on the user data.

Clause 49: The computer program product of clauses 47 or 48, wherein the user data is temporarily stored in memory by the token management system, and wherein the one or more instructions further cause the at least one processor to: delete the user data after authorization based on the authorization request.

Clause 50: The computer program product of any of clauses 47-49, wherein the public key of the second key pair is embedded in a library file for a client-side script.

Clause 51: The computer program product of any of clauses 47-50, wherein the one or more instructions further cause the at least one processor to: digitally sign the transient token based on the private key of the first key pair.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which:

FIGS. 4A-4E are sequence diagrams of a method for securely transmitting data via a third-party webpage according to non-limiting embodiments.

DETAILED DESCRIPTION

Figure 1:
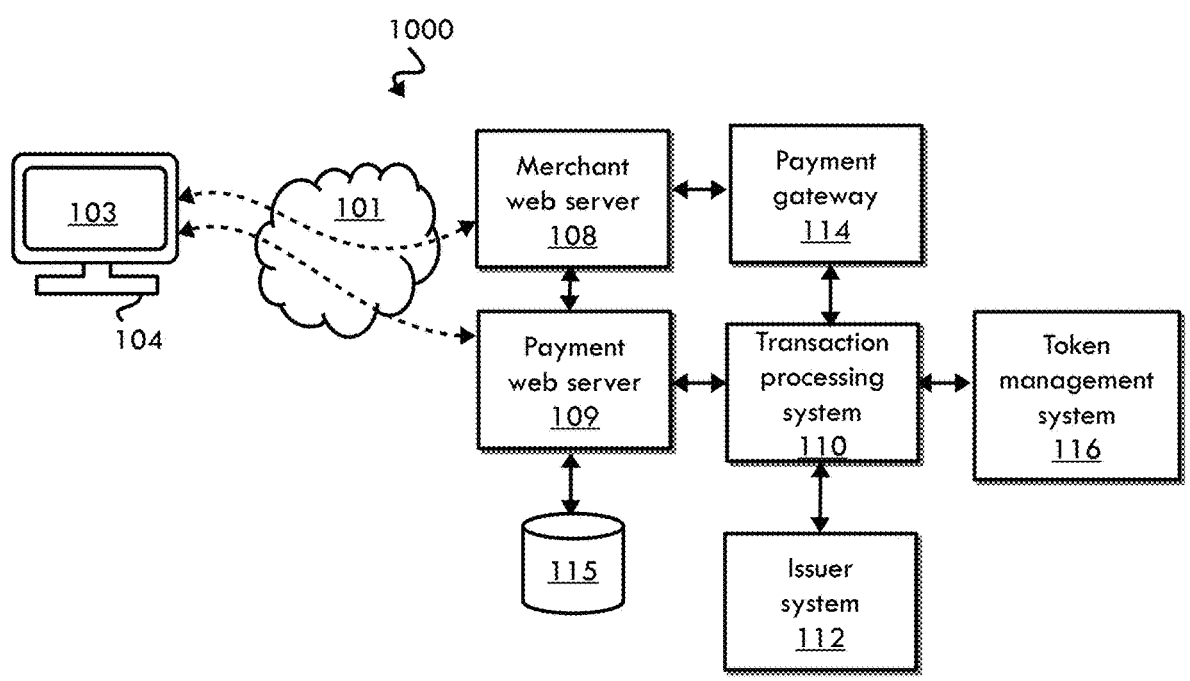
FIG. 1 is a schematic diagram of a system for securely transmitting data via a third-party webpage according to non-limiting embodiments.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the present disclosure. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical financial instrument, e.g., a payment card, and/or may be electronic and used for electronic payments. The term "issuer system" refers to one or more computing devices operated by or on behalf of an issuer institution, such as a server computer executing one or more software applications. For example, an issuer system may include one or more authorization servers for authorizing a transaction.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. As used herein, the terms "merchant" or "merchant system" may also refer to one or more computer systems operated by or on behalf of a merchant, such as a server computer executing one or more software applications. As used herein, the term "point-of-sale (POS) system," may refer to one or more computing devices and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "domain" refers to one or more networks or network hosts within the same physical or logical infrastructure. A domain may be identified by a domain name, a network address, and/or the like.

The systems, methods, and computer program products described herein provide numerous technical advantages in an electronic payment processing network. For example, e-commerce websites hosted by certain merchants may not be as secure as desired due to the technology available to and provided by the merchants. Non-limiting embodiments described herein provide for secure payment transactions that avoid the technical security flaws and associated risks of existing payment systems, such as an MitM attack. Non-limiting embodiments provide for a new protocol and process for rendering a webpage for collecting sensitive information in a manner that avoids the typical flow of data through the primary host server and is also verifiable. Non-limiting embodiments described herein also provide for efficiencies in an electronic payment processing network, such as reduced bandwidth and reduced usage of computational resources resulting from reducing and/or eliminating communications between systems that may be involved in verifying whether a payment transaction is a valid payment transaction or remedying a fraudulent payment transaction (e.g., a payment transaction that was viewed and/or updated by an entity not intended to be involved in the payment transaction).

FIG. 1 depicts a system 1000 for securely transmitting data via a third-party webpage 103 according to a non-limiting embodiment. A user device 104 associated with a user is used to access a third-party webpage (e.g., merchant webpage 103 or other webpage hosted by an untrusted party) through a network environment 101, such as the Internet. The user device 104 executes a browser application that is configured to display the merchant webpage 103 based on data received from a merchant web server 108 and payment web server 109 (or some other trusted server). In operation, configuration data is generated for configuring a plurality of frames (e.g., in-line frames) within a merchant webpage 103 displayed via the browser application on the user device 104. The configuration data may be generated and transmitted by the payment web server 109, a payment gateway 114, and/or a transaction processing system 110. In some non-limiting embodiments, the configuration data is stored in a database 115 in communication with the payment web server 109 and is transmitted to merchant web server 108 from the payment web server 109.

Still referring to FIG. 1, the merchant webpage 103 includes webpage data from merchant web server 108 that is generated based on the configuration data. The configuration data specifies parameters for embedding frames into the merchant webpage 103, including network information (e.g., Domain Name Server (DNS) data and/or a network address) associated with each frame, the size of each frame, the location of each frame, and/or the like. The configuration data may also specify a network address of one or more scripts located at one or more network locations. Merchant web server 108 renders the merchant webpage 103 on the user device 104 operated by the user. In some non-limiting embodiments, the network information includes DNS data relating to domains associated with the merchant system or webpage. Using the network information that is provided, it can be ensured that the scripts and frames are only executed and accessed by a trusted merchant domain (e.g., a whitelisted domain corresponding to the merchant web server 108).

With continued reference to FIG. 1, the merchant webpage 103 is displayed on the user device 104 with a plurality of browser frames (not shown in FIG. 1). In some non-limiting embodiments, each frame may be associated with one or more input fields or selectable options, such as one or more text fields, buttons, checkboxes, drop-down menus, selection menus, and/or the like. The content of each frame of the plurality of frames may be transmitted from a domain that is separate from the merchant web server 108. In the depicted example, the content of the frames is provided by the payment web server 109 which is physically and logically separate from the merchant web server 108. For example, each frame may reference an in-line hyperlink for a webpage hosted by the payment web server 109 that includes one or more input fields or selectable options. In this manner, multiple communication connections may be established between the user device 104 and the payment web server 109 via the multiple frames. The merchant webpage 103 and/or frame content may prompt a user of the user device 104 to input user information (e.g., account information or other sensitive data) into the one or more input fields and/or selectable options that are presented via the frames. In this manner, sensitive user information may be provided directly to the payment web server 109 without being accessible by merchant web server 108.

In some non-limiting embodiments, the configuration data may be verified such that an entity is unable to intercept packets and/or spoof the payment web server 109. As an example, the configuration data may be digitally signed after being generated (e.g., the configuration data or data derived therefrom, such as a hash, may be encrypted with a private key corresponding to a public key of a long-standing public/private key pair). By cryptographically signing the configuration data, the configuration data may represent the state of the system through the entire process and a verifiable delivery of the state to the payment web server 109 and/or transaction processing system 110. The elements of the configuration data may also be encrypted using any encryption technique. The corresponding public key may be embedded in a script or other data that is provided to the user device 104 from the payment web server 109 (e.g., via one or more frames embedded in the merchant webpage 103). In this manner, the browser application executing on the user device 104 is enabled to verify the configuration data. For example, the encrypted value (e.g., derived from the configuration data) may be verified by a client-side script executed by the user device 104 using the corresponding public key such that the merchant web server 108 and/or other entities are unable to fake or spoof the configuration data to fraudulently obtain the sensitive user information. In response to determining that the configuration data is not valid (e.g., that it has been corrupted or altered), the payment web server 109 may then display an alert message via one or more of the frames and/or prevent sensitive user information from being inputted.

Still referring to FIG. 1, in some non-limiting embodiments, once user data and/or other information is inputted into the plurality of frames, the data is transmitted to the payment web server 109. User data may include, for example, account data (e.g., PAN or other account identifier, expiration date, verification code, etc.), name, address, birthdate, and/or any other information that a user may input into the plurality of frames. In some examples, the data may be aggregated and packaged by the browser application on the user device 104 before being transmitted. For example, one frame of the plurality of frames may coordinate the collection and aggregation of data from each other frame using one or more scripts. In other non-limiting embodiments, the data may be collected and aggregated from the multiple frames using server-side functionality provided by the payment web server 109.

With continued reference to FIG. 1, in some non-limiting embodiments, a temporary key may be generated by the payment web server 109 for use in the transaction. The temporary key may be a key from a first public/private key pair that is specific to the transaction. For example, the public key of the key pair may be contained within the configuration data and the private key of the key pair may be maintained by the payment web server 109. In this manner, the browser application on the user device 104 (e.g., a script executed by the browser) may encrypt the user data inputted into the plurality of frames with the public key. In this manner, the user data may only be decrypted by the entity in possession of the private key (e.g., the payment web server 109 and/or transaction processing system 110).

Still referring to FIG. 1, in some non-limiting embodiments in which the payment web server 109 is in possession of the private key, the payment web server 109 may decrypt the user data and transmit the decrypted user data to the transaction processing system 110. The transaction processing system 110, after receiving the decrypted user data, may generate a transient token (e.g., a limited use payment token) based on the user data. The transient token (e.g., the transient token itself and/or a reference to the transient token) may then be transmitted to the user device 104 via (e.g., through) one or more of the frames on the merchant webpage 103 using the connection established between the payment web server 109 and the user device 104. The transient token may then be communicated (e.g., passed) from the one or more frames to the merchant web server 108 via a script executed by the browser application on the user device 104. Once the merchant web server 108 has access to the transient token, the merchant web server 108 may generate a transaction request message that includes the transient token.

In some non-limiting embodiments, the transaction processing system 110 may digitally sign the transient token with the private key that was generated as part of the temporary public/private key pair such that the corresponding public key is the public key contained within the configuration data. The transient token, after being digitally signed, may then be verified by the merchant web server 108 or other merchant system with the public key that was included in the configuration data. Once the transient token is verified, it can be trusted even after the temporary keys are no longer used.

In some non-limiting embodiments, the transaction request message including the transient token is transmitted from merchant web server 108 or other merchant system to the payment gateway 114 and/or transaction processing system 110. The transaction processing system 110 may determine user data from the transient token by querying a token management system 116. Once the transaction processing system 110 obtains the user data associated with the transient token, the transaction processing system 110 generates an authorization request message including the user data and transmits the authorization request message to an issuer system 112 for processing.

In some non-limiting embodiments, and with continued reference to FIG. 1, a transaction request may be processed by the payment web server 109 and/or transaction processing system 110 without use of the database 115 storing the configuration data. As a result of cryptographically signing the configuration data with a key of a long-standing key pair (e.g., a second key pair that is used for multiple transactions), the configuration data including the public key of a first key pair (e.g., a temporary key pair generated for the transaction), and the transient token being digitally signed with the private key of the first key pair, the system 1000, may operate in a stateless manner. For example, once the configuration data and the transient token are obtained by the transaction processing system 110 as part of an authorization request, the transaction may be processed without the need to access the database 115.

FIG. 1 shows a non-limiting embodiment in which the system 1000 is used to conduct payments with a merchant. However, it will be appreciated that non-limiting embodiments may be implemented to securely transmit data via any type of third-party webpage. For example, any sensitive user data such as healthcare data, financial data, personally identifying data, and/or the like, may be protected using non-limiting embodiments.

Figure 2:
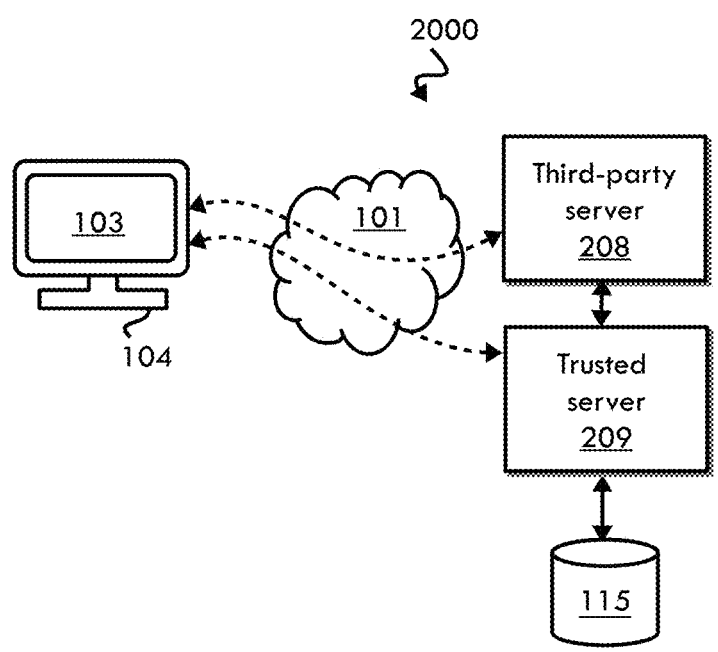
FIG. 2 is a schematic diagram of a system for securely transmitting data via a third-party webpage according to non-limiting embodiments.

Referring now to FIG. 2, a system 2000 is illustrated for securely transmitting data via a third-party webpage 103 according to a non-limiting embodiment. In this example, the third-party webpage 103 is hosted by a third-party server 208 that may not be trusted by the user. A trusted server 209 transmits configuration data from a database 115 to the third-party server 208 over the network 101 or some other communication path to enable the third-party server 208 to render the third-party webpage 103 on the user device 104. The third-party webpage 103 may include a plurality of frames pointing to the trusted server 209 and populated with web content from the trusted server 209, as configured based on the configuration data. As described in connection with FIG. 1, the configuration data may be digitally signed by the trusted server 209 such that it can be verified.

Figure 3:
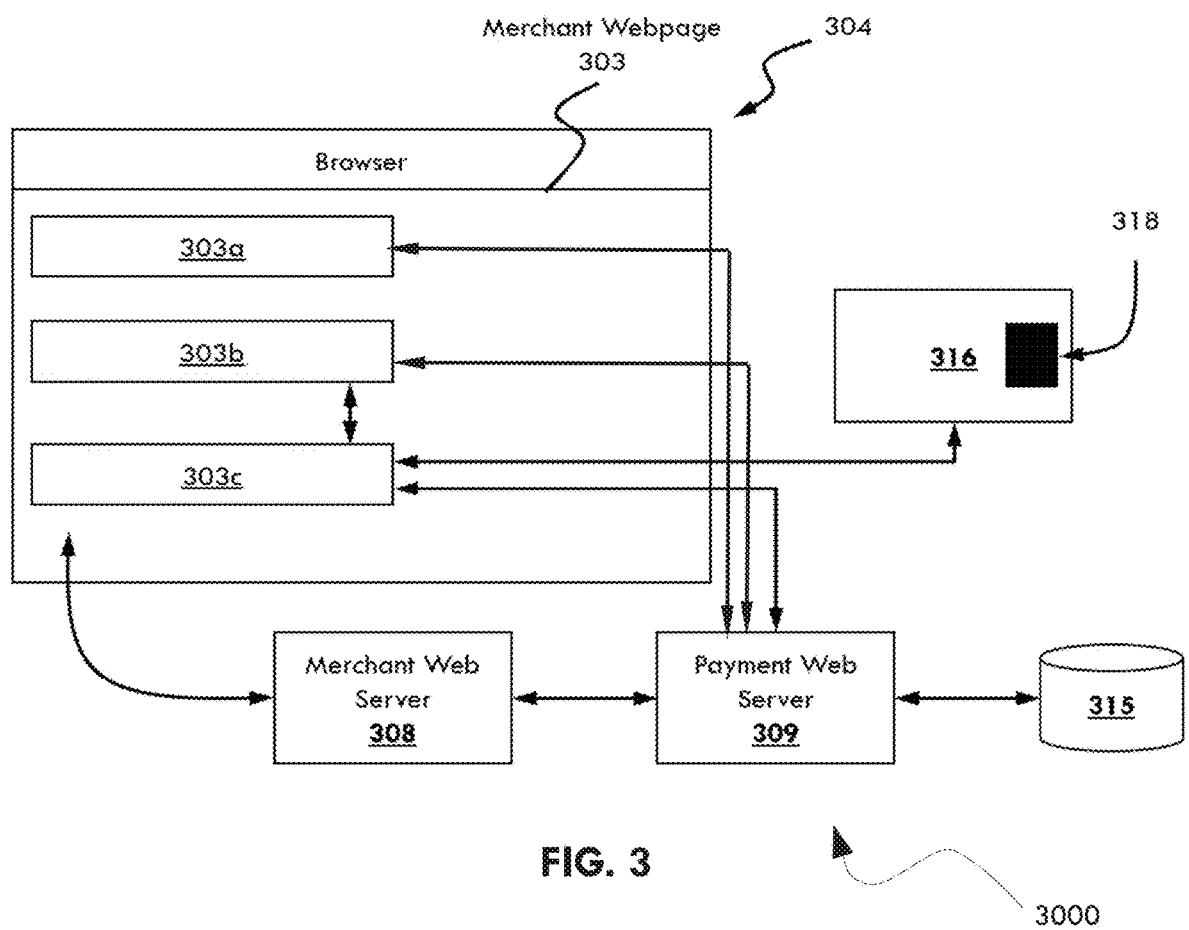
FIG. 3 is a schematic diagram of a system for securely transmitting data via a third-party webpage according to non-limiting embodiments.

Referring now to FIG. 3, shown is a system 3000 for transmitting data via a third-party webpage 303 according to a non-limiting embodiment. The system 3000 may include a user device 304, a merchant web server 308, a payment web server 309, a database 315, and a server computer 316. In some non-limiting embodiments or aspects, the user device 304 may be the same as or similar to the user device 104, the merchant web server 308 may be the same as or similar to the merchant web server 108, the payment web server 309 may be the same as or similar to the payment web server 109, and/or the database 315 may be the same as or similar to the database 115.

With continued reference to FIG. 3, the user device 304 may be configured to render the merchant webpage 303. For example, the user device 304 may be configured to render the merchant webpage 303 using a web browser application based on data received from the merchant web server 308 (e.g., including configuration data as described herein, web content, and/or the like). In some non-limiting embodiments or aspects, the merchant webpage 303 may be rendered with one or more frames 303a, 303b, 303c included therein. For example, the merchant webpage 303 may include frames 303a, 303b, and 303c that display web content provided by the payment web server 309 and/or some other server (e.g., such as server 316). The frames may be outlined with a border or may seamlessly appear on the webpage 303. To display the merchant webpage 303, the merchant web server 308 may communicate with the payment web server 309 (e.g., in some examples including an Application Programming Interface (API) server associated with the payment web server 309). The merchant web server 308 may, for example, provide domain information (e.g., such as DNS information, domain name system addresses, URLs, and/or the like) associated with the merchant webpage 303 (e.g., a checkout page).

Still referring to FIG. 3, the payment web server 309 or associated system (e.g., an API server or some other server associated with the payment web server 309) may then communicate cryptographically signed data (e.g., such as encrypted JSON Web Token (JWT) data) including configuration data specific to the merchant and merchant webpage 303. In some examples, the configuration data may be cryptographically signed with a private key of a long-living (e.g., used for numerous transactions) public/private key pair. The private key may be stored in a hardware security module (HSM) 315 associated with the transaction processing system. In non-limiting embodiments, the configuration data may include a public key of a temporary public/private key pair (e.g., generated and used for a single transaction) and DNS information. The configuration data may also include webpage content and/or style data (e.g., fonts, images, etc.), endpoint configurations (e.g., one or more specific URLs associated with the payment web server 309), and content specific to the transaction context (e.g., 3D-Secure order data).

In response to the merchant web server 308 receiving the configuration data from the payment web server 309, the merchant web server 308 renders the merchant webpage 303 (e.g., a checkout page) on the user device 304. The merchant webpage may include a reference to a Software Development Kit (SDK) 318 or other software tools stored, for example, by server computer 316 (e.g., as a JavaScript file). The payment web server 309 and SDK 318 may be protected by Subresource Integrity (SRI), as an example. The browser executed by the user device 304 interprets the web content to display the merchant webpage 303 and passes execution control to the payment web server 309. The payment web server 309 then uses the public key of the long-standing public/private key pair (the private key of which is stored in the HSM 315) to validate the signed configuration data (e.g., ensuring that it was not tampered with, replaced, and/or the like). The payment web server 309 may then, in response to validating the configuration data, render the frames 303a, 303b, 303c with content from the payment web server 309. The frame 303c, for example, may be served with a Content Security Policy (CSP) that permits the browser to display the content of the frame 303c only if it is a whitelisted domain specified by the merchant.

With continued reference to FIG. 3, the content of the frame 303c may be served from the payment web server 309 and/or an associated API server, in which case the domain of the merchant web server 308 is known and HTTP CSP headers may be generated. In other non-limiting embodiments, the content of the frame 303c may be served from the other server 316 (e.g., as part of a Content Delivery Network (CDN)), in which case the server 316 is provisioned with public key corresponding to the private key of the long-standing public/private key pair (the private key of which is stored in the HSM 315) to validate the configuration data. The other server 316 may reflect back the domain names from the configuration data in CSP headers.

During the loading of frame 303c, data may be retrieved from the payment web server 309 or other server 316 that includes the public key corresponding to the private key of the long-standing public/private key pair (the private key of which is stored in the HSM 315). The digital signature guarantees that all parameters can be trusted without any further communication with the payment web server 309. In response to rendering the content of frame 303c and/or validating the configuration data, the frame 303c may establish communication with other frame(s) (e.g., at least 303b) being hosted by the payment web server 309 via the user device 304 such that the data never passes through the merchant web server 308. The digitally signed configuration data, including domain information, are used to restrict communication to other frame(s) 303a and/or the merchant webpage 303 to prevent any other frame, such as a malicious frame, to receive or transmit any data during the transaction. Moreover, the configuration data may restrict communication between frames 303b, 303c to predefined messages that cannot be used to extract information from the frames 303b, 303c.

Once a user has input data through the frames 303a, 303b, 303c, a script executed within frame 303c aggregates the input by receiving the user data from each frame and collecting it. Frame 303c may then use the public key of the temporary public/private key pair (e.g., generated for the transaction) to generate encrypted data that includes, for example, the user's payment information, such as an account identifier and the like. The encrypted data may then be communicated from the user device 304 to the payment web server 309 without passing through the merchant web server 308. In response to receiving the encrypted data, the payment web server 309 processes it (e.g., decrypts the data), obtains and/or generates a transient token (e.g., a payment token for a one-time or limited use), and communicates the transient token to the merchant web server 308 by first communicating the token to the merchant webpage 303 on the user device 304 (e.g., via frame 303c which passes the token to the merchant webpage 303 via the user's web browser), in response to which the merchant webpage 303 communicates the token to the merchant web server 308 to be used for the payment. The merchant webpage 303 may cryptographically sign the payment token with the private key of the temporary public/private key pair (e.g., generated for the transaction) before communicating the token to the merchant web server 308. The merchant web server 308, in response to receiving the signed token, may then utilize the corresponding public key embedded in the configuration data to validate the signed token. The result of this process is that the merchant possesses the valid token that is cryptographically verifiable and both the merchant and the payment web server are able to detect any fraudulent activity by interference through the encryption and digital signature validations.

Referring now to FIGS. 4A-4E, illustrated are sequence and schematic diagrams of a system 4000 and method for securely transmitting data via a webpage according to non-limiting embodiments. The system 4000 may include a user device 404, a merchant web server 408, and a payment web server 409. In some non-limiting embodiments or aspects, the user device 404 may be the same as or similar to the user device 102, the merchant web server 408 may be the same as or similar to the merchant web server 108, and/or the payment web server 409 may be the same as or similar to the payment web server 109.

At step 425, the payment web server 409 may receive a request for configuration data from the merchant web server 408. For example, the payment web server 409 may receive a request for configuration data from the merchant web server 408 based on the merchant web server 408 receiving a request for a merchant webpage from the user device 404. In such an example, the configuration data may be associated with configuring a web browser to display a merchant webpage including one or more frames. In some non-limiting embodiments, the merchant webpage (e.g., a merchant webpage associated with a merchant and/or hosted by the merchant web server 408) may be associated with a checkout process involved in an online payment transaction involving the user associated with the user device 404 and the merchant associated with the merchant web server 408. However, as explained herein, the systems and methods described herein may be used in various other contexts.

At step 430, payment web server 409 may generate configuration data. For example, the payment web server 409 may generate configuration data based on the request for configuration data from the merchant web server 408. In some non-limiting embodiments, the payment web server 409 may generate the configuration data based on the merchant web server 408, where the merchant web server 408 is a web server associated with a merchant from among a plurality of merchants served by the payment web server 409. In some non-limiting embodiments or aspects, generating the configuration data may include a public key of a temporary public/private key pair generated for a payment transaction that involves the merchant web server 408 and the user device 404. In some non-limiting embodiments or aspects, the public key may be associated with the user device 404.

At step 435, a payment web server 409 may digitally sign the configuration data using a private key of a long-standing public/private key pair associated with the payment web server 409 (e.g., where the private key is a cryptographic key known only to the payment web server 409).

Figure 4A:
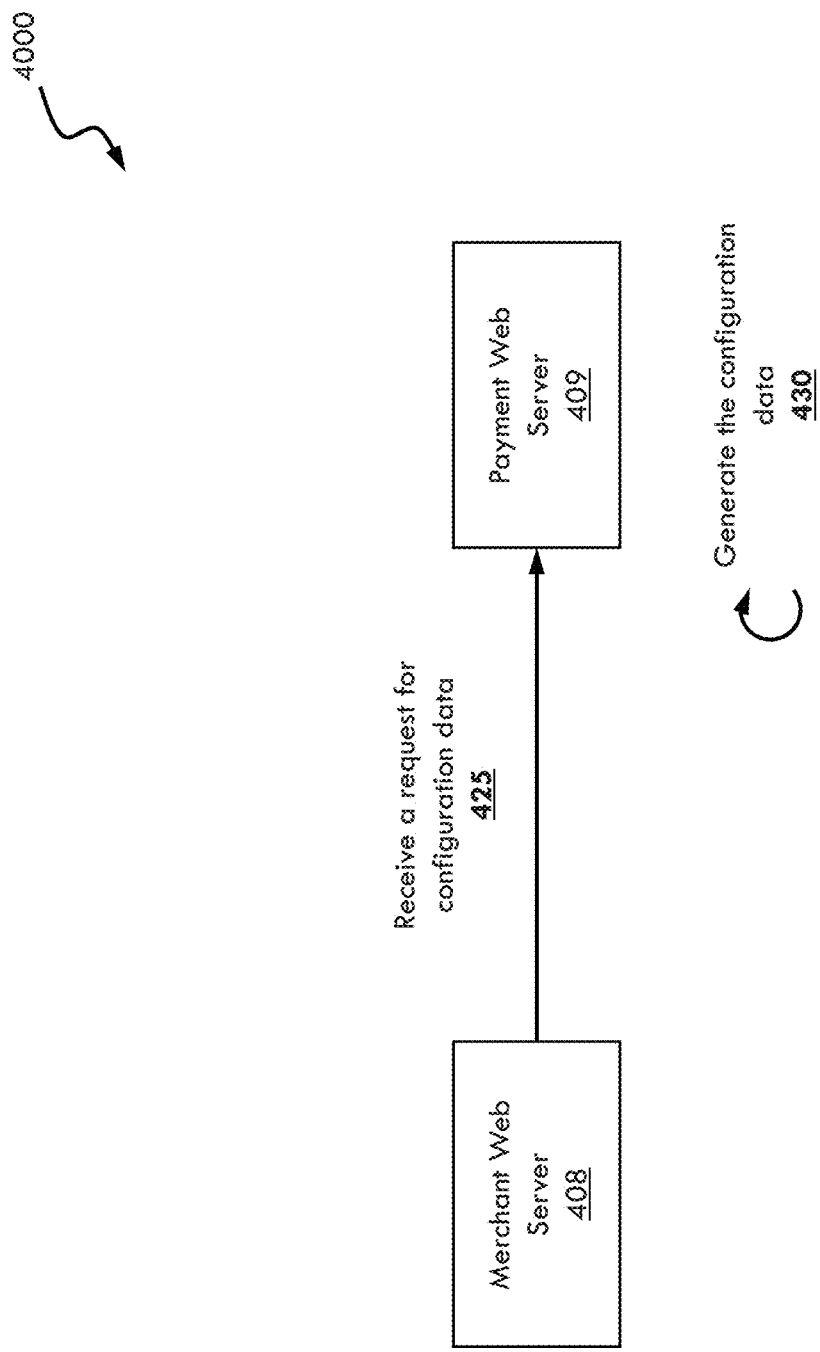
Figure 4B:
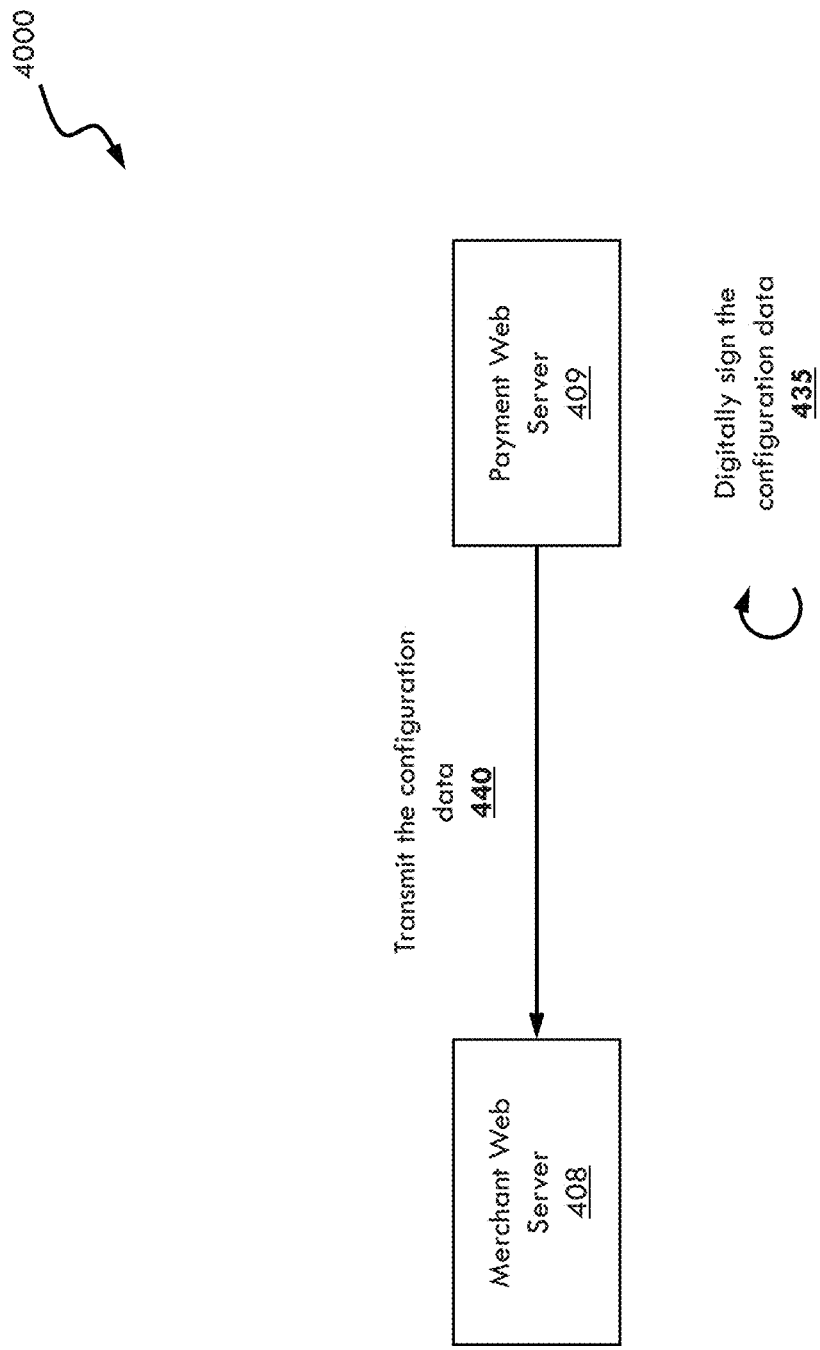

At step 440 in FIG. 4B, the payment web server 409 may transmit the configuration data to the merchant web server 408 based on the merchant web server 408 receiving the request for the configuration data. Additionally, or alternatively, the payment web server 409 may transmit the configuration data to the merchant web server 408 based on the payment web server 409 generating the configuration data.

Figure 4C:
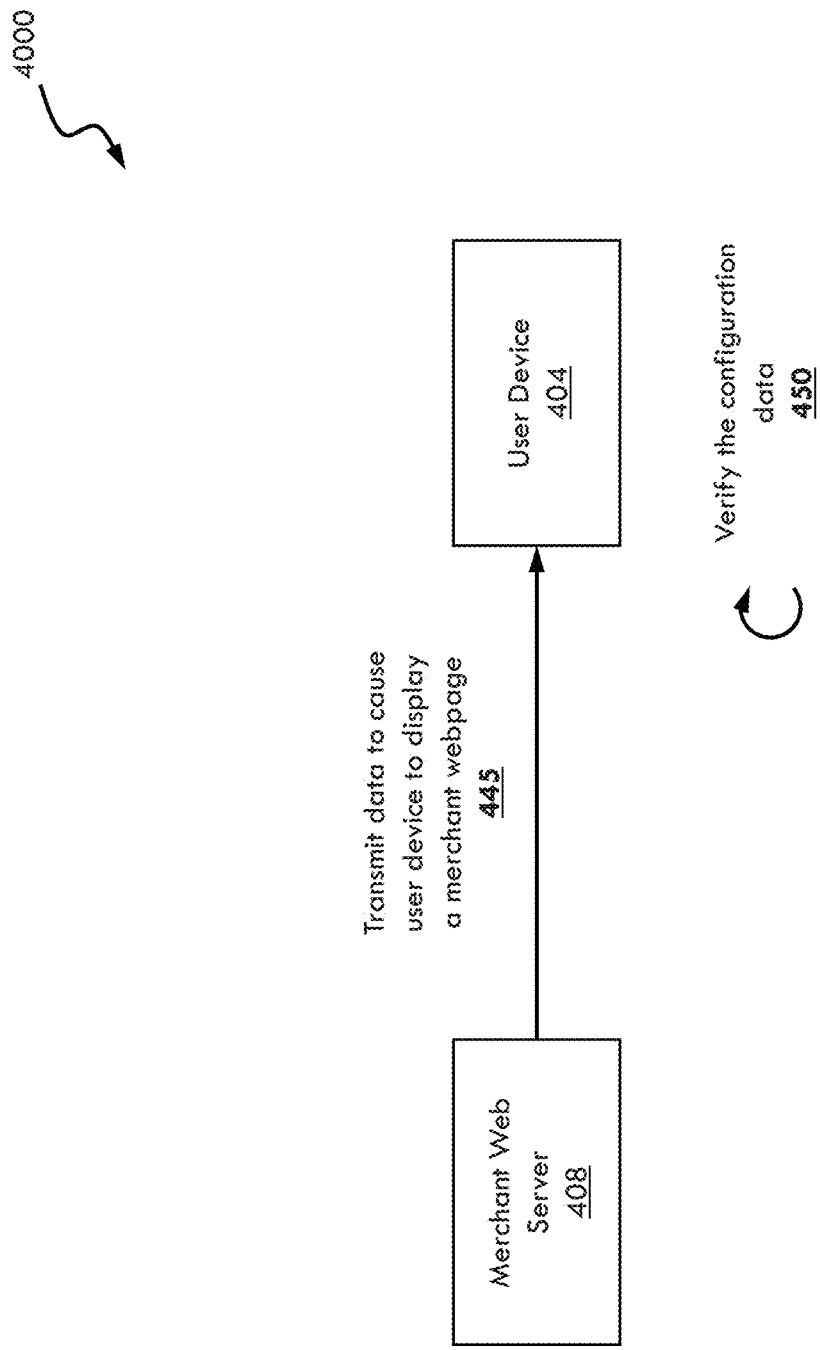

At step 445 in FIG. 4C, the merchant web server 408 may transmit data configured to cause the user device 404 to render a merchant webpage through a web browser application or a separate network-enabled application. For example, the merchant web server 408 may transmit data configured to cause the user device 404 to render a merchant webpage on a display of the user device 404 based on the merchant web server 408 receiving the configuration data from the payment web server 409.

At step 450 in FIG. 4C, the user device 404 may verify the configuration data based on a public key corresponding to the private key of the long-standing public/private key pair associated with the payment web server 409. In some non-limiting embodiments, the user device 404 may verify the configuration data based on the user device 404 requesting the public key associated with the payment web server 409 from the payment web server 409.

At step 455 in FIG. 4D, the user device 404 may display a merchant webpage including a plurality of frames. For example, the user device 404 may render a merchant webpage including a plurality of frames based on data received from the merchant web server 408. In some non-limiting embodiments or aspects, the plurality of frames may include content hosted by one or more domains that are independent of a domain associated with a merchant that provides the main merchant webpage. In some non-limiting embodiments, the user device 404 may receive a public key from the payment web server 409 through one of the frames to enable the user device 404 to validate the configuration data used to render the page. In some non-limiting embodiments, the public key associated with the payment web server 409 may be local to (e.g., hardcoded within) the web browser associated with the user device 404.

At step 460 in FIG. 4D, a user device 404 may receive encrypted data from a master frame 403c. In some non-limiting embodiments, the user device 404 may receive input corresponding to one or more frames associated with the master frame 403c (e.g., one or more frames different from the master frame 403c) and the one or more frames associated with the master frame 403c may transmit data associated with the input to the master frame 403c. In this way, data may be aggregated from multiple frames within the frame 403c before being transmitted by the user device 404. It will be appreciated that the frames 403c, 403b, 403a, may also provide non-aggregated data directly to the user device 404.

At step 465 in FIG. 4E, the user device 404 may transmit the encrypted data associated with input corresponding to one or more frames associated with the master frame to a payment web server 409. For example, the user device 404 may transmit the data associated with input corresponding to one or more frames associated with master frame 403c to the payment web server 409 via the master frame 403c.

In some non-limiting embodiments, the payment web server 409 may receive a transaction request from the merchant web server 408 including the transient token generated based on the token management system receiving data (e.g., data received from the user device 404 by the payment web server 409). In some non-limiting embodiments, the payment web server 409 may obtain the data associated with the user device 404 from the token management system and the payment web server 409 may generate an authorization request based on the data associated with the user device 404. In some non-limiting embodiments, the token management system may delete the data after an authorization response (e.g., authorizing, not authorizing, and/or the like) is received based on the authorization request.

Figure 5:
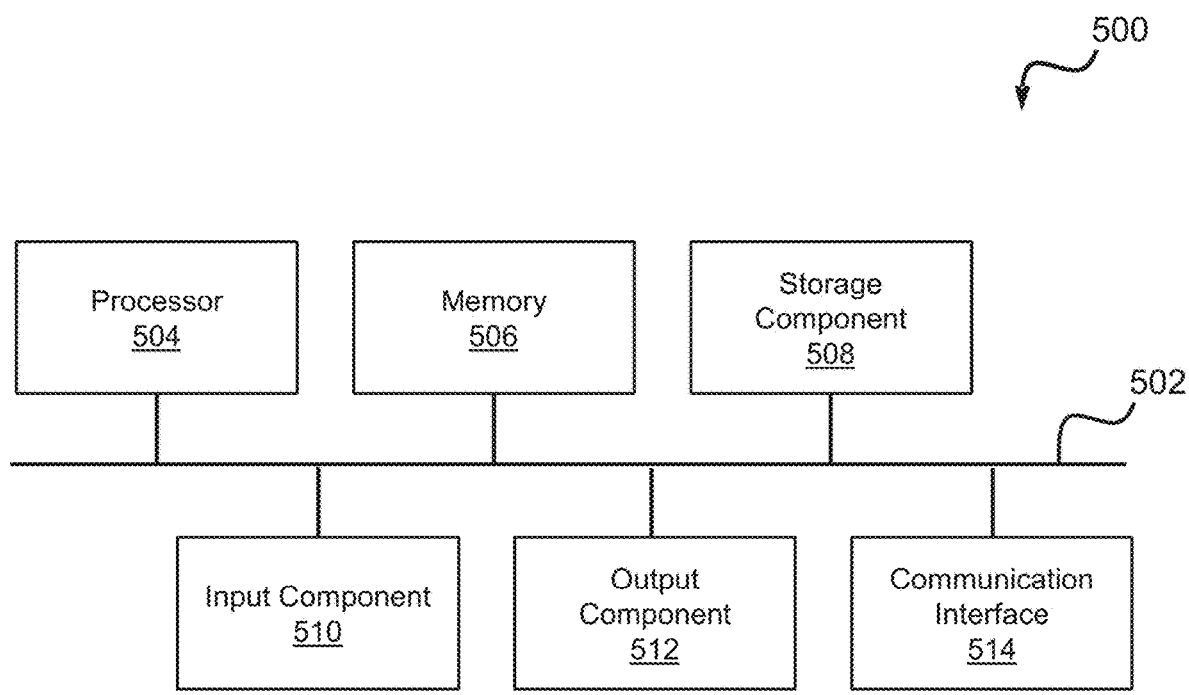
FIG. 5 illustrates example components of a device used in connection with non-limiting embodiments.

Referring now to FIG. 5, illustrated is a diagram of example components of a device 500 according to non-limiting embodiments. The device 500 (e.g., one or more components of the device 500) may correspond to the user device 104, the merchant web server 108, the payment web server 109, the transaction processing system 110, the issuer system 112, the payment gateway 114, the database 115, and/or the token management system 116. In some non-limiting embodiments or aspects, the device 500 (e.g., one or more components of the device 500) may correspond to the third-party server 208, the trusted server 209, the user device 304, the merchant web server 308, the payment web server 309, the database 315, and/or the server computer 316. In some non-limiting embodiments or aspects, the device 500 (e.g., one or more components of the device 500) may correspond to the user device 404, the merchant web server 408, and/or the payment web server 409.

In some non-limiting embodiments, such systems or devices may include at least one device 500 and/or at least one component of the device 500. The number and arrangement of components illustrated are provided as an example. In some non-limiting embodiments, the device 500 may include additional components, fewer components, different components, or differently arranged components than those illustrated in FIG. 5. Additionally, or alternatively, a set of components (e.g., one or more components) of the device 500 may perform one or more functions described as being performed by another set of components of the device 500.

As illustrated in FIG. 5, the device 500 may include a bus 502, a processor 504, memory 506, a storage component 508, an input component 510, an output component 512, and a communication interface 514. The bus 502 may include a component that permits communication among the components of the device 500. In some non-limiting embodiments, the processor 504 may be implemented in hardware, firmware, or a combination of hardware and software. For example, the processor 504 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 506 may include random access memory (RAM), read only memory (ROM), and/or another type of dynamic or static storage device (e.g., flash memory, magnetic memory, optical memory, etc.) that stores information and/or instructions for use by the processor 504.

With continued reference to FIG. 5, the storage component 508 may store information and/or software related to the operation and use of the device 500. For example, the storage component 508 may include a hard disk (e.g., a magnetic disk, an optical disk, a magneto-optic disk, a solid state disk, etc.) and/or another type of computer-readable medium. The input component 510 may include a component that permits the device 500 to receive information, such as via user input (e.g., a touch screen display, a keyboard, a keypad, a mouse, a button, a switch, a microphone, etc.). Additionally, or alternatively, the input component 510 may include a sensor for sensing information (e.g., a global positioning system (GPS) component, an accelerometer, a gyroscope, an actuator, etc.). The output component 512 may include a component that provides output information from the device 500 (e.g., a display, a speaker, one or more light-emitting diodes (LEDs), etc.). The communication interface 514 may include a transceiver-like component (e.g., a transceiver, a separate receiver and transmitter, etc.) that enables the device 500 to communicate with other devices, such as via a wired connection, a wireless connection, or a combination of wired and wireless connections. The communication interface 514 may permit the device 500 to receive information from another device and/or provide information to another device. For example, the communication interface 514 may include an Ethernet interface, an optical interface, a coaxial interface, an infrared interface, a radio frequency (RF) interface, a universal serial bus (USB) interface, a Wi-Fi® interface, a cellular network interface, and/or the like.

The device 500 may perform one or more processes described herein. The device 500 may perform these processes based on the processor 504 executing software instructions stored by a computer-readable medium, such as the memory 506 and/or the storage component 508. A computer-readable medium may include any non-transitory memory device. A memory device includes memory space located inside of a single physical storage device or memory space spread across multiple physical storage devices. Software instructions may be read into the memory 506 and/or the storage component 508 from another computer-readable medium or from another device via the communication interface 514. When executed, software instructions stored in the memory 506 and/or the storage component 508 may cause the processor 504 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment

What is claimed is:

1. A computer-implemented method for securely collecting data via a third-party webpage, comprising:
   receiving configuration data from a payment system, the configuration data comprising an address for at least one script and a temporary public key;
   verifying, with a user device executing the at least one script, the configuration data based on a public key identified by the at least one script;
   rendering, on the user device, a webpage comprising a plurality of embedded frames based on the configuration data and a server computer;
   encrypting, with the user device executing the at least one script, input data received by at least one embedded frame of the plurality of embedded frames with the temporary public key;
   receiving, with the user device, a transient token from the payment system through at least one embedded frame of the plurality of embedded frames; and
   passing, with the user device executing the at least one script, the transient token to the server computer.

2. The computer-implemented method of claim 1, wherein the at least one script comprises a plurality of different scripts.

3. The computer-implemented method of claim 1, wherein the server computer comprises a merchant web server, and wherein the merchant web server receives the configuration data from the payment system and causes the user device to render the webpage.

4. The computer-implemented method of claim 1, further comprising:
   in response to receiving the transient token from the user device, generating, with the server computer, a transaction request message comprising the transient token; and
   communicating the transaction request message to the payment system.

5. The computer-implemented method of claim 4, wherein the transient token is digitally signed with a temporary private key corresponding to the temporary public key, further comprising:
   verifying, with the server computer, the transient token based on the temporary public key,
   wherein the transaction request message is generated in response to verifying the transient token.

6. The computer-implemented method of claim 1, wherein rendering the webpage is based on verifying that the configuration data is valid.

7. The computer-implemented method of claim 1, further comprising:
   requesting, with the server computer, the configuration data from the payment system in response to a payment transaction initiated by a user of the user device.

8. A system for securely collecting data via a third-party webpage, comprising:
   at least one processor programmed or configured to:
      verify, by executing at least one script, configuration data based on a public key identified by the at least one script, the configuration data received by a server computer from a payment system, the server computer in communication with the at least one processor, the configuration data comprising an address for the at least one script and a temporary public key;

render a webpage comprising a plurality of embedded frames based on the configuration data and the server computer;

encrypt, by executing the at least one script, input data received by at least one embedded frame of the plurality of embedded frames with the temporary public key;

receive a transient token from the payment system through at least one embedded frame of the plurality of embedded frames; and pass, by executing the at least one script, the transient token to the server computer.

9. The system of claim 8, wherein the at least one script comprises a plurality of different scripts.

10. The system of claim 8, wherein the server computer comprises a merchant web server, and wherein the merchant web server receives the configuration data from the payment system and causes a user device to render the webpage.

11. The system of claim 8, further comprising the server computer, the server computer programmed or configured to:

in response to receiving the transient token from a user device, generate a transaction request message comprising the transient token; and communicate the transaction request message to the payment system.

12. The system of claim 11, wherein the transient token is digitally signed with a temporary private key corresponding to the temporary public key, further comprising the server computer, the server computer programmed or configured to:

verify the transient token based on the temporary public key, wherein the transaction request message is generated in response to verifying the transient token.

13. The system of claim 8, wherein rendering the webpage is based on verifying that the configuration data is valid.

14. The system of claim 8, further comprising the server computer, the server computer programmed or configured to:

request the configuration data from the payment system in response to a payment transaction initiated by a user of a user device.

15. A computer program product comprising at least one non-transitory computer-readable medium comprising one or more instructions that, when executed by at least one processor, cause the at least one processor to:

verify, by executing at least one script, configuration data based on a public key identified by the at least one script, the configuration data received by a server computer from a payment system, the server computer in communication with the at least one processor, the configuration data comprising an address for the at least one script and a temporary public key;

render a webpage comprising a plurality of embedded frames based on the configuration data and the server computer;

encrypt, by executing the at least one script, input data received by at least one embedded frame of the plurality of embedded frames with the temporary public key;

receive a transient token from the payment system through at least one embedded frame of the plurality of embedded frames; and pass, by executing the at least one script, the transient token to the server computer.

16. The computer program product of claim 15, wherein the at least one script comprises a plurality of different scripts.

17. The computer program product of claim 15, wherein the server computer comprises a merchant web server, and wherein the merchant web server receives the configuration data from the payment system and causes a user device to render the webpage.

18. The computer program product of claim 15, wherein rendering the webpage is based on verifying that the configuration data is valid.

19. The computer program product of claim 15, further comprising at least one second non-transitory computer-readable medium comprising one or more instructions that, when executed by at least one server computer, cause the at least one server computer to:

in response to receiving the transient token from a user device, generate a transaction request message comprising the transient token; and communicate the transaction request message to the payment system.

20. The computer program product of claim 19, wherein the transient token is digitally signed with a temporary private key corresponding to the temporary public key, wherein the at least one server computer is further caused to:

verify the transient token based on the temporary public key, wherein the transaction request message is generated in response to verifying the transient token.

* * * * *